UNITED STATES PATENT OFFICE.

LUELLA MILES, OF LAWRENCE, MASSACHUSETTS.

OINTMENT.

SPECIFICATION forming part of Letters Patent No. 451,307, dated April 28, 1891.

Application filed February 20, 1891. Serial No. 382,227. (No specimens.)

*To all whom it may concern:*

Be it known that I, LUELLA MILES, a citizen of the United States, residing at Lawrence, in the county of Essex and State of Massachusetts, have invented a new and useful Composition of Matter to be Used as an Ointment or Salve, of which the following is a specification.

The ointment or salve produced by my composition is intended to be used as a remedy for burns, chapped skin, cuts, cold-sores, pimples, salt rheum, and other diseases of the skin.

My composition consists of the following ingredients combined in the proportions stated, viz: rose-water, one pint; alcohol, one quart; carbolic acid, one gill; corn-starch, nine pounds; whites of eggs, one pint; glycerine, two quarts; oil of citronella, one-fourth gill; iodoform, 1 dram; white petrolatum, seventeen pounds. These ingredients are to be thoroughly mingled by agitation, the mixing being preferably done as each article is added. I prefer to mix them in the following order, viz: rose-water, alcohol, carbolic acid, four pounds corn-starch, whites of eggs, glycerine, oil of citronella, iodoform, five pounds corn-starch, lily-white petrolatum. The composition thus produced is to be applied externally as an ointment or salve as a remedy for the diseases of and accidents to the skin above mentioned, and when thus applied has an exceedingly curative effect.

What I claim, and desire to secure by Letters Patent of the United States, is—

The herein-described composition of matter to be used as a salve or ointment for diseases of and accidents to the skin, consisting of rose-water, alcohol, carbolic acid, corn-starch, whites of eggs, glycerine, oil of citronella, iodoform, and white petrolatum, in substantially the proportions specified.

LUELLA MILES.

Witnesses:
    JAMES MILES,
    JULIA LORDEN.